Figure 1:
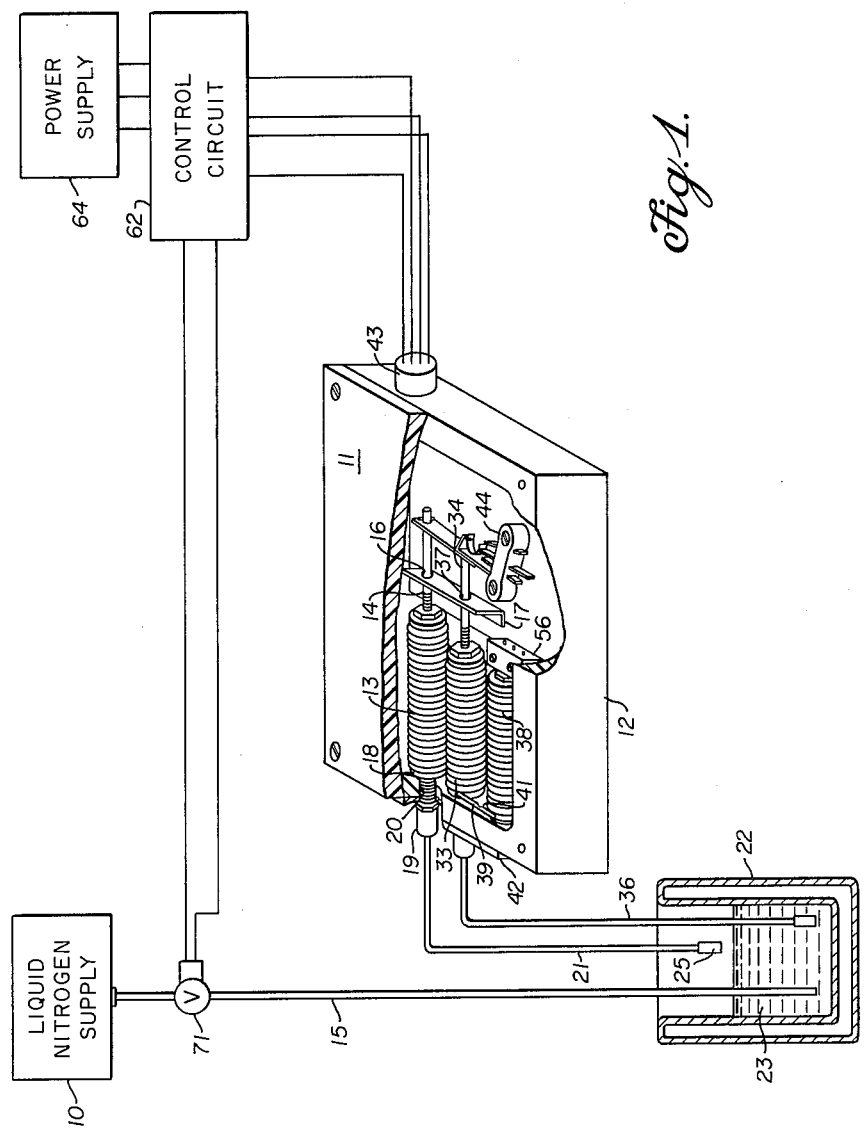

July 26, 1966  R. L. CHANEY  3,262,280
LEVEL CONTROL FOR CRYOGENIC LIQUID
Filed Oct. 26, 1964  2 Sheets-Sheet 1

INVENTOR.
RAY L. CHANEY
BY
ATTORNEY.

July 26, 1966  R. L. CHANEY  3,262,280
LEVEL CONTROL FOR CRYOGENIC LIQUID
Filed Oct. 26, 1964  2 Sheets-Sheet 2
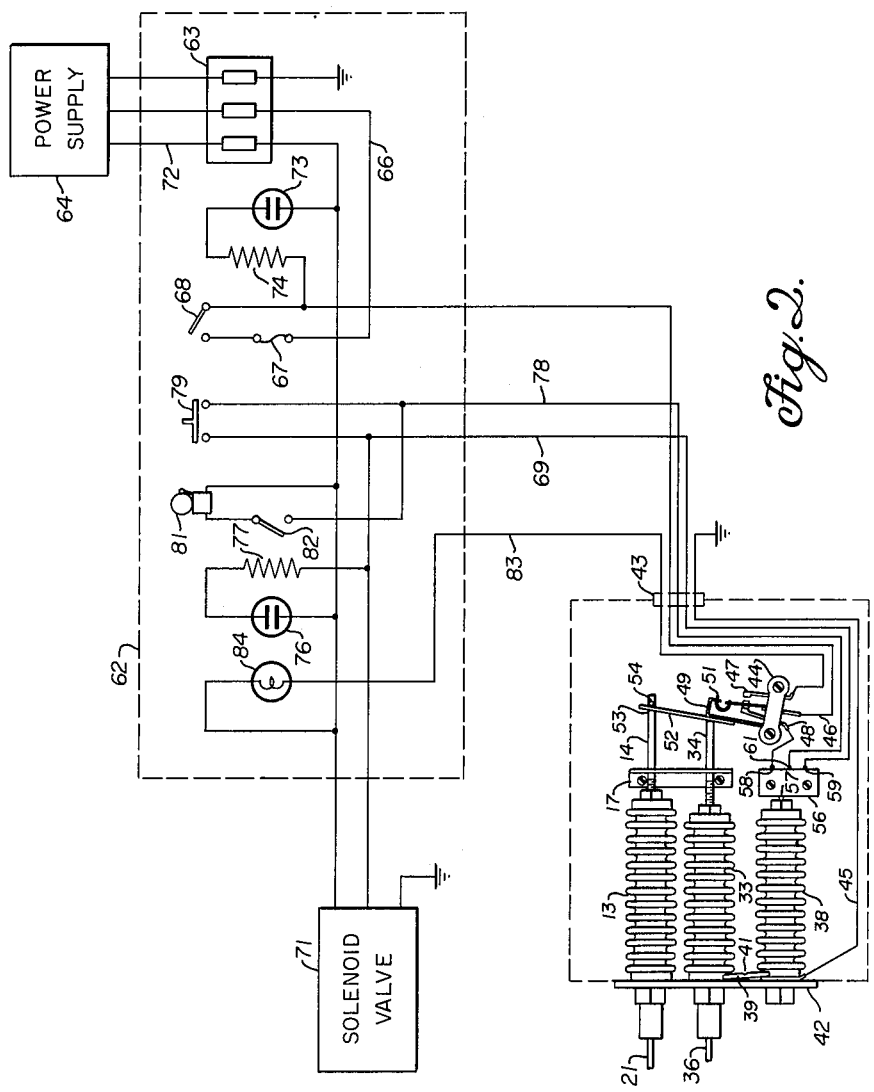
Fig. 2.
Fig. 3.
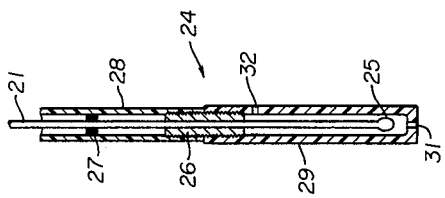
INVENTOR.
RAY L. CHANEY
BY
ATTORNEY.

United States Patent Office 3,262,280
Patented July 26, 1966

3,262,280
LEVEL CONTROL FOR CRYOGENIC LIQUID
Ray L. Chaney, San Leandro, Calif., assignor to the United States of America as represented by the United States Atomic Energy Commission
Filed Oct. 26, 1964, Ser. No. 406,634
5 Claims. (Cl. 62—49)

This invention relates to liquid level sensing and control devices and more particularly to a compact and reliable apparatus for maintaining the level of a very low temperature liquid in a container within specified limits. The invention described herein was made in the course of, or under, Contract W-7405-eng-48 with the United States Atomic Energy Commission.

Cryogenic liquids are extensively used to cool apparatus which requires a low temperature. A typical usage of this type is in connection with charged particle accelerator vacuum systems and in the target structures employed with such accelerators. In many of these installations it is desirable to have some degree of automatic control of the level of a cryogenic liquid in a vacuum trap, dewar or other vessel. This is particularly true where such cryogenic liquid containers are used in the presence of radiation levels to high to permit constant atendance of personnel.

Under these conditions great difficulty has been experienced in attempts to obtain any reasonably satisfactory automatic control of the level of cryogenic liquid in cold traps and other vessels. While there are many satisfactory forms of level control for ordinary fluids, cryogenic liquids pose unique problems. At the extreme low temperatures of such liquids, the components of mechanical mechanisms tend to freeze to adjacent elements. Systems which depend on the movement of liquid through conduits, valves and the like may clog or become restricted from similar causes. Electrical systems may be undesirable in that heat is delivered to the liquid thereby accelerating evaporation losses.

Because of high rates of loss in the transfer line from the storage dewar to the vessel in which the fluid is used a quick transfer of liquid is desired. This results in the necessity for a quick sensing of the liquid level at the desired point and prompt termination of the liquid transfer in order to avoid overfilling. Cost is also a factor since the most satisfactory equipment heretofore available for the purpose of controlling levels of cryogenic liquids is relatively expensive and in many cases the cost may make the use of such automatic devices impractical.

The present invention meets the problems discussed above by providing a novel device which is reliable, compact, rugged and simple, and which is quick acting. The device makes use of collapsible bellows having a tube that may extend into the vessel to be monitored. When a tube end disposed within the vessel is contacted by the cold cryogenic liquid, the gas within the tube undergoes thermal contraction and therefore the bellows contracts. Three such thermally sensitive units are employed in the invention. The end of the tube from a first bellows unit is disposed in the vessel at the low level limit and when exposed to air by a drop of the liquid level the gas therein expands causing the bellows to expand and operate a switch. The switch opens a solenoid controlled valve permitting the cryogenic liquid to flow into the vessel. As it is quickly re-cooled by the rising liquid, the first bellows will retract before filling is complete and accordingly means are provided to hold the supply open irrespective of such retraction. The end of the tube from the second bellows is disposed in the vessel at a desired upper limit of liquid level and when liquid reaches this level this bellows contracts and operates to open the switch and close the solenoid valve thereby stopping the filling operation. This cycle then repeats as required.

The third thermally sensitive bellows unit is connected to the tube of the first bellows through a flow restriction so that the third unit is activated by the same condition as the first unit, specifically the dropping of the liquid level to the lower limit. The restriction however provides a time delay in the operation of the third unit so that normally the third unit is not actuated at all as the container is provided with additional cryogenic liquid within a short time after the first sensing unit is exposed above the liquid nitrogen level. Thus the gas within third unit is normally immediately re-cooled before the bellows can expand. However, if the system has not functioned to refill the vessel after operation of the first unit, then the third unit is enabled to operate after a short time delay. The third unit is arranged to operate an alarm, activate a standby liquid supply, or otherwise provide a degree of fail safety.

Therefore it is an object of the present invention to provide improved means for controlling the level of a very cold liquid in a container.

A further object of the invention is to provide a compact and highly reliable automatic control for maintaining the level of a cryogenic liquid in a container within required upper and lower limits.

Still another object of this invention is the provision of an automatic level control for cryogenic liquids having safety means which functions in the event cryogenic fluid is not automatically provided within a specified time after the liquid reaches the lowest permissible level.

It is a further object of the invention to provide mechanism which may be set to maintain a cryogenic liquid in a container between specific levels which levels are thereby fixed irrespective of such variables as the cross-sectional area of the container and the rate at which liquid is supplied to the container.

Another important object of the invention is to provide means for automatically supplying more cryogenic liquid to a container when the liquid level reaches a specified lower limit together with means for automatically stopping the supply of additional liquid when the level reaches a specified upper limit which upper limit is precisely determined rather than being based on a timed period of filling.

Other objects and advantages of the invention will become obvious to those skilled in the art upon consideration of the following description and accompanying drawing of which:

FIGURE 1 is a partly cut-away perspective view of mechanical and electromechanical elements of the invention shown in conjunction with a cryogenic liquid container, FIGURE 2 is a diagram of the electrical circuitry associated with the apparatus of FIGURE 1, and FIGURE 3 is a cross-sectional view of one of the level sensing elements of the invention.

Referring now to the drawing and particularly to FIGURE 1 thereof is shown a double walled container 22 which may be a cold trap or any other vessel of the type containing a cryogenic liquid such as liquid nitrogen 23 and in which the liquid supply must be periodically replenished owing to losses from boil-off other causes. To effect such refilling, a source of liquid nitrogen 10 is connected to container 22 through a normally closed solenoid valve 71 and filler conduit 15. The valve 71 is operated by a control unit 11.

Considering now the detailed structure of the control unit 11, most of the components thereof are enclosed within a flat rectangular box 12. This control unit 11 has a first thin walled tubular bellows 13 of the type which is cylindrical with circular accordion pleats and which is thus expansible in the axial direction. Bellows 13 sealed at one end and connected at this end to a rod 14 which is provided with a threaded portion at the attached end so that its amount of projection from the bellows may be adjusted. Rod 14 slidably extends through a bore 16 in an angle bracket 17 which is mounted in the bottom of the box 12. The other end of bellows 13 is sealingly secured to the end wall of box 12 by means of an annular end closure 18 having a threaded neck which extends through a bore 20 in the box and which is secured thereto by a nut 19. A long first tube 21 is connected to the neck of closure 18 and thus communicates with the bellows 13, the remote end of the tube being sealed. The tube 21 and bellows 13 are filled with dry nitrogen gas at a pressure of 15 to 18 pounds per square inch gauge, for example. For greater sensitivity and quicker response of the bellows to the action of the cold liquid acting on the sealed end of tube 21, the element sealing the end of the bellows may have a cylindrical portion extending inside the bellows which greatly reduces the amount of gas required to fill the bellows and attached tube. The sealed remote end 25 of tube 21 may be placed in the cryogenic liquid container 22 to determine the upper level of liquid in the container.

Referring to FIGURE 3, the tube 21 has a splash protector 24 provided thereon. At a short distance from the sealed end, for example about two inches, a threaded insulative cylinder 26 is disposed coaxially on the tube, and a few layers of tape 27 are wrapped around tube 21 somewhat further from the sealed end of the tube than the cylinder 26. A plastic tube 28 covers a portion of the screw 26 remote from the sealed end of tube 21 and also covers the tape 27 and the portion of tube 21 therebetween. Tube 28 is twisted on the cylinder 26 to secure the tube in place. A second tube 29, closed at one end except for a small bore 31, fits over the sealed end of tube 21 and is twisted on the opposite end of threaded cylinder 26. This tube 29, formed of heat insulating plastic, is provided with a bore 32 in one side adjacent to the end of cylinder 26. With this protector in place, splashes which may occur from liquid flowing into the container 22 of FIGURE 1 cannot strike the end of the sensing tube 21 and contract the bellows 13 causing premature stoppage of the filling cycle. Instead, liquid nitrogen contacts the sensing tube only by rising through the bore 31 and surrounding the end of tube 21 causing operation of the bellows 13 at the desired liquid level.

Referring again to FIGURE 1, a second similar bellows 33 is sealed at one end to which is attached a rod 34 of adjustable extension therefrom. A second sensing tube 36 is secured to the other end of bellows 33 in a manner similar to the juncture of bellows 13 and tube 21. The bellows 33 is secured to the end of box 12 in a position parallel to bellows 13 and rod 34 passes through a bore 37 in the bracket 17. The sealed end of the tube 36 is placed in the container 22 in a position to fix the lower limit of liquid 23 therein.

A third similar bellows 38 is mounted in box 12 parallel to bellows 33. A length of tube 39 connects the fixed end of the third bellows 38 to the second bellows 33 so that gas may flow therebetween. A restriction 41 in tube 39 provides a time delay between the expanison of bellows 33 and that of bellows 38 so that bellows 38 may provide an alarm as will be described later.

To provide for convenient connection of circuit elements to ground, a grounding plate 42 extends under the nut 19 which retains the bellows 13 in position and likewise under the nuts retaining bellows 33 and 38. A ground wire 45, shown in FIGURE 2, connects to the bellows closure 18 and to a ground terminal in a five prong connector 43 which is disposed on an end wall of box 12 and which provides for electrical connection thereto.

Referring now to FIGURE 2 in conjunction with FIGURE 1, a single pole double throw switch 44, has a spring switching contact member 46 and fixed contact members 47 and 48 on either side thereof. A second spring member 49 is secured at one end and is angled at the other end to hold a toggle 51 for operating the switching contact member 46. An extension 52 of the second spring 49 is provided so that rods 14 and 34 from the first and second bellows may control the operation of switch 44. Switch 44 is so secured to the bottom of box 12 that first bellows rod 14 passes through a hole 53 in extension 52 in slidable relation thereto. A cross member 54, secured to the rod 14 beyond the extension 52, provides means for pulling on the extension when bellows 13 contracts. The second rod 34 and the extension 52 are so positioned that the rod will press against the extension when the second bellows 33 expands, pushing spring 49 far enough to cause toggle 51 to push spring contact 46 over against contact 48.

A microswitch 56 is secured to the bottom of box 12 in such location that the operating button 57 of the microswitch will be operated by the end structure of the third bellows 38 when this bellows expands. Microswitch 56 is also a single pole double throw switch which has a common terminal 58 which is closed to the terminal 59 when the switch button 57 is not contacted by bellows 38 and is closed to contact 61 when the switch button 57 is pressed by the bellows.

Referring to FIGURE 2, a control circuit 62 includes a terminal block 63 which is connected by conductors 66 and 72 to a power source 64. A first side 66 of the power supply line connects through a fuse 67 and an on-off switch 68 to the center spring contact 46 of switch 44. Terminal 48 of switch 44 is connected to terminal 58 of switch 56. The second side 72 of the power line is connected from terminal block 63 to the first side of solenoid 71 by conductor 72. A neon lamp 73 in series with resistor 74 is connected across conductors 66 and 72 to provide a visual indication that power is turned on. A second neon lamp 76 in series with resistor 77 is connected in parallel with the solenoid valve 71 thus providing a visual indication when power is furnished to the valve. A connection is made from the terminal 59 of the single pole double throw switch 56 to the solenoid valve 71, the first side of which is connected to one side of the power source by line 72. Therefore power connected through to terminal 59 from line 66 will activate the valve. Another connection by means of line 78 from terminal 61 of the switch 56 to the line 72 through an alarm bell 81 and an alarm turn-off switch 82 operates the alarm bell when power from line 66 is provided to the terminal 61. As previously mentioned power from line 66 is provided to switch 56 from contact 48 of switch 44. A button switch 79, normally open, is connected across from line 69 to line 78 to operate valve 71 manually when the alarm bell 81 is operating. An incandescent lamp 84 is connected across power supply lines 66 and 72 by means of line 83, through switch 68 and contacts 46 and 47 of switch 44, providing a visual indication when no additional liquid nitrogen is being called for.

In operation, when the liquid nitrogen level drops below the level of the lower senser element 36, the bellows 33 attached thereto expands and rod 34 presses against the extension 52 of spring 49 which slides outward on rod 14 and moves the end of spring 49 outward sufficiently to actuate toggle 51 and cause spring switch member 46 to swing away from the contact 47 to contact 48. This opens the circuit to lamp 84 and closes the circuit from contact 48 through terminals 58 and 59 of switch 56 to the solenoid valve 71, thus opening the valve and allowing additional liquid nitrogen to flow into container 22. At the same time lamp 76 is energized to indicate that additional liquid nitrogen is required.

As the level of the liquid nitrogen 23 in container 22 reaches the lower senser tube 36, the bellows 33 and rod 34 retract from contact with the switch spring extension 52. However, the switch 44 will not operate at this time since the toggle 51 keeps the switch from operating until switch spring extension 52 is pulled back by rod 14.

When the level of liquid nitrogen reaches the upper senser tube 21 the bellows 13 contracts pulling back the rod 14 which, by means of cross member 54, pulls back the spring extension 52 and spring 49 causing the toggle 51 to operate to open the circuit to contact 48 and close the circuit to contact 47 thus returning the system to the original condition.

When the bellows 33 expands upon the call for additional liquid nitrogen due to the lower senser element 36 being exposed above the liquid nitrogen level 23, gas pressure also starts to build up in the third bellows 38 through the connecting tube 39 but at a much lower rate than the pressure build-up bellows 33 due to the restriction 41 in the tube. This introduces a time delay in the expansion of the third bellows 38 and, should the provision of additional liquid nitrogen fail to occur within the time delay built into the device, the bellows 38 will contact the button 57 of microswitch 56 causing bell 81 to sound an alarm. The push-button switch 79 may then be operated to open the solenoid valve 71 and provide additional liquid nitrogen under manual control.

Although the present invention has been disclosed with respect to a single exemplary embodiment it will be evident to those skilled in the art that many variations are possible within the spirit and scope of the invention. Therefore it is not intended to limit the invention except as defined by the following claims.

What is claimed is:

1. A liquid level control for use with a cryogenic liquid vessel comprising, in combinaton, a first sensing unit having a first bellows and a first tube sealingly coupled thereto and enclosing a first volume of gas, said first tube having an end situated in said vessel at the lower level limit therein an electric switch operated by expansion of said first bellows and being connected to initiate the flow of additional cryogenic liquid to said vessel, a second sensing unit having a second bellows and a second tube sealingly connected thereto and enclosing a second volume of gas, said second tube having an end situated in said vessel at the upper level limit thereof, means operatively coupling said second bellows to said switch to terminate the flow of cryogenic liquid to said vessel when said second bellows contracts, a third bellows coupled to said first tube through a flow restriction causing expansion of said third bellows to be delayed relative to expansion of said first bellows whereby said third bellows does not expand if said end of said first tube is promptly re-cooled by said flow of additional liquid to said vessel, and means sensing expansion of said third bellows to detect a condition wherein said liquid level is not promptly raised above said lower limit.

2. A liquid level control as described in claim 1 wherein said end of said second tube within said vessel is protected by a partial enclosure attached to said tube by thermally insulative means whereby said tube is shielded from contact with splashing cryogenic liquid during said flow of liquid into said vessel.

3. A liquid level control as described in claim 1 wherein said flow of cryogenic liquid into said vessel is controlled by a solenoid valve and wherein said switch is of the bi-stable class having a first position holding said valve closed and having a second position holding said valve open, said first bellows being connected to operate said switch from said first position to said second position upon expansion of said first bellows, and said second bellows being connected to operate said switch from said second position to said first position upon contraction of said second bellows.

4. Apparatus for maintaining a cryogenic liquid in a container between predetermined upper and lower limits comprising a normally closed electrically operated valve, a supply of said liquid connected to said container through said valve, an electrical power source, an electrical switch having a contact movable from a first position at which said power source is connected to said valve to a second position at which said power source is disconnected therefrom, a first and a second cylindrical gas-filled bellows each having a fixed end and a movable end and each having an element coupled to said movable end for operating said movable contact of said switch, said element of said first bellows being disposed to move said first contact to said first position upon expansion of said first bellows and said element of said second bellows being disposed to move said contact to said second position upon contraction of said second bellows, and first and second gas-filled tubes extending into said container from said first and second bellows respectively to the lower and upper of said liquid limits respectively.

5. Apparatus for maintaining a cryogenic liquid in a container between predetermined upper and lower limits as described in claim 4 and comprising the further combination of a third cylindrical gas-filled bellows having a fixed end and a movable end, a third tube connecting said third bellows with said first tube through a flow restriction, and means operated by said movable end of said third bellows for detecting an expansion thereof thereby indicating a failure of said liquid level to be restored promptly to a level above said lower limit.

References Cited by the Examiner

UNITED STATES PATENTS

| | | | |
|---|---|---|---|
| 1,346,898 | 7/1920 | Kingsbury | 137—394 X |
| 2,667,178 | 1/1954 | Fred et al. | 137—392 |
| 2,817,299 | 12/1957 | Weis | 137—392 X |
| 3,049,887 | 9/1962 | Sharp et al. | 62—55 |
| 3,085,433 | 4/1963 | Shmueli | 73—295 |
| 3,170,479 | 2/1965 | Mueller | 137—392 |
| 3,199,303 | 8/1965 | Haumann et al. | 62—49 |

LLOYD L. KING, *Primary Examiner.*